No. 771,524. PATENTED OCT. 4, 1904.
W. T. ARNOLD.
PLANTER.
APPLICATION FILED JAN. 22, 1904.
NO MODEL. 2 SHEETS—SHEET 1.

WITNESSES:
T. P. Britt
E. C. Duffey

INVENTOR
W. T. Arnold,
By O. E. Duffey & Son
Attorneys

No. 771,524. PATENTED OCT. 4, 1904.
W. T. ARNOLD.
PLANTER.
APPLICATION FILED JAN. 22, 1904.
NO MODEL. 2 SHEETS—SHEET 2.
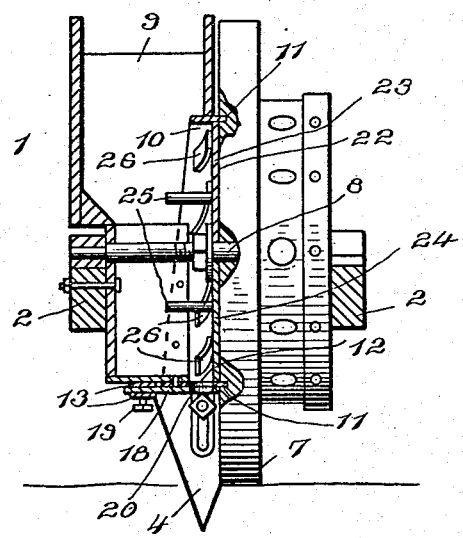
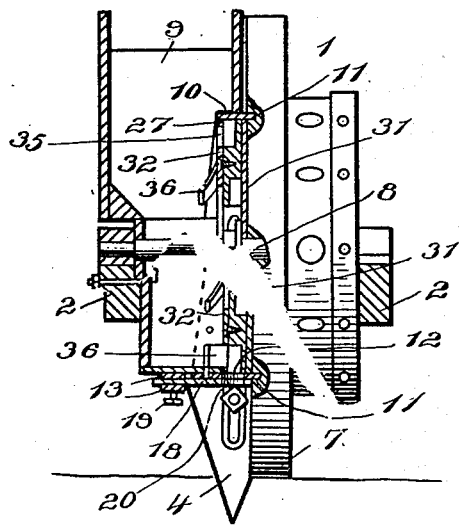
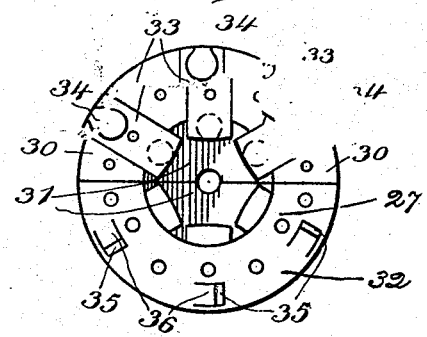
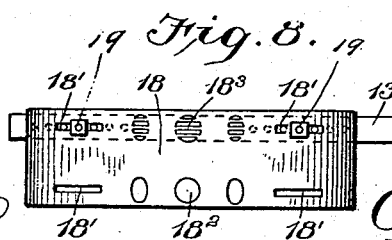

No. 771,524.                    Patented October 4, 1904.

UNITED STATES PATENT OFFICE.

WILLIAM THOS. ARNOLD, OF ATLANTA, GEORGIA.

PLANTER.

SPECIFICATION forming part of Letters Patent No. 771,524, dated October 4, 1904.

Application filed January 22, 1904. Serial No. 190,185. (No model.)

*To all whom it may concern:*

Be it known that I, WILLIAM THOS. ARNOLD, a citizen of the United States, residing at Atlanta, in the county of Fulton and State of Georgia, have invented certain new and useful Improvements in Planters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to planters, and has for its object to provide a device of this class which is designed to plant seeds—such as cotton, peas, corn, &c.—and which also can be used for distributing fertilizer.

With this object in view my invention consists in the particular arrangement which provides for planting the seed or distributing the fertilizer from a stationary hopper, said stationary hopper being associated with a revolving hopper, as described in my contemporaneous application for patent, Serial No. 171,083, filed August 28, 1903.

My invention also consists in the arrangement employed for regulating the amount of seed or fertilizer which is dropped from the hopper and also in providing means for planting seed and distributing fertilizer at one and the same time.

My invention also consists in certain other novel features and in combination of parts, which will be first fully described and afterward specifically pointed out in the appended claims.

Figure 1:
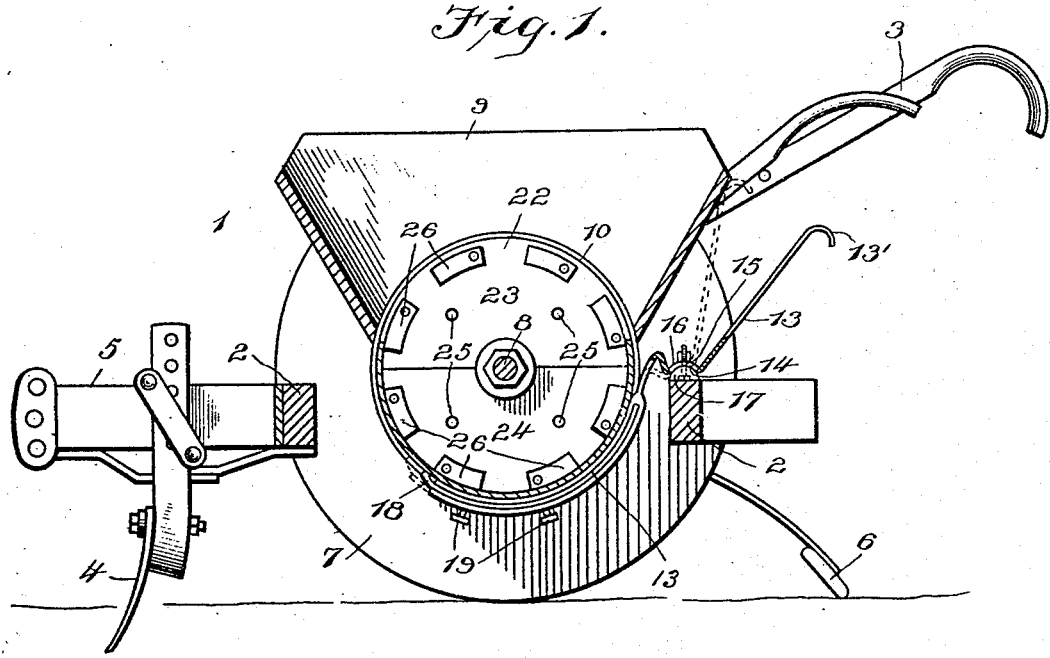
Figure 2:
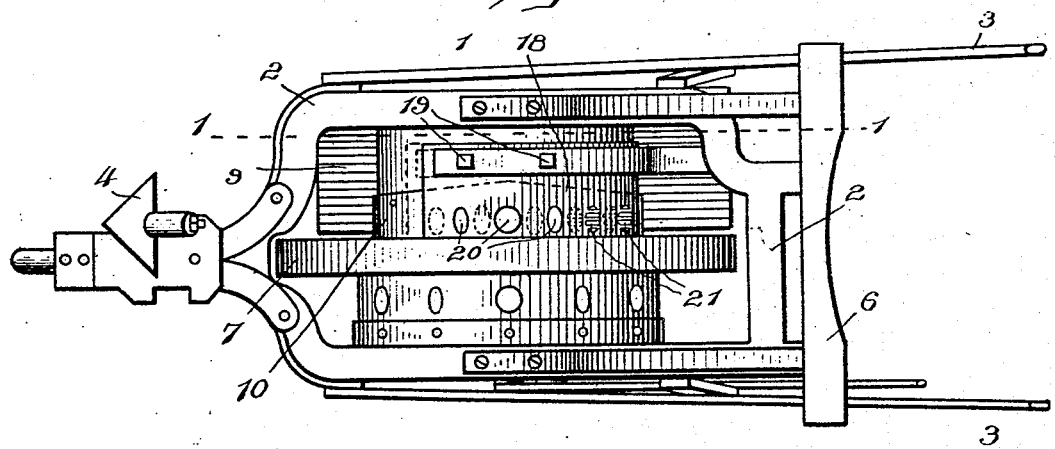
Figure 7:
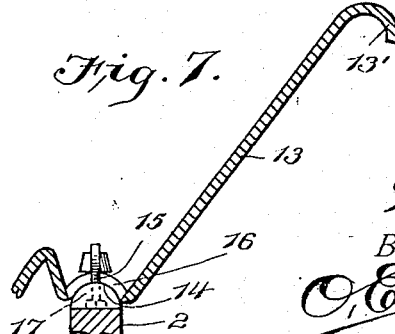

Referring to the accompanying drawings, Figure 1 is a vertical longitudinal section through the planter, taken on line 1 1 of Fig. 2. Fig. 2 is a bottom plan view of the planter. Fig. 3 shows a vertical transverse section through the stationary hopper, the revolving hopper being shown in elevation. Fig. 4 is a view similar to Fig. 3, showing a detachable disk secured within a revolving hopper for the purpose of causing the seed to be dropped at different intervals. Fig. 5 is a side elevation of the disk shown in section in Fig. 4, having one-half of the covering-plate removed. Fig. 6 is a perspective view of one of the removable and reversible wooden blocks carried in the disk as shown in Fig. 5, which allows for the seed to be dropped from the stationary hopper and also allows for regulating the amount of seed dropped therefrom, as the openings 34 on one side of said blocks are of a size different from the openings on the other side of the blocks, so that by reversing the blocks a larger or smaller quantity of seed will be led through the perforations in the stationary hopper, according to the size of the said openings in the said blocks. Fig. 7 is a fragmentary view of regulating-lever, and Fig. 8 is a detail view showing a modification of the slide shown in Fig. 2.

Like numerals of reference indicate the same parts throughout the several figures, in which—

1 is the planter, and 2 is the frame thereof, having the handles 3, secured as shown, and a furrow-opener or drill-tooth 4, secured to the beam 5 just in the rear of the clevis. Said drill-tooth 4 is vertically adjustable and is also reversible and can be secured on either side of the beam 5, as is necessary in order to plant from either the stationary or revolving hopper. A suitable coverer 6 is secured, as shown, in rear of the revolving wheel 7, which is fixed to the shaft 8, suitably journaled to the frame 2. This construction, as also the construction and internal arrangement of the revolving hopper, is the same as that shown and described in my contemporaneous pending application before referred to, and therefore a detailed description of these parts is not necessary in this application, which is being limited to the arrangement of the stationary hopper and the means of distributing the seed therefrom, as will be presently described.

9 indicates the stationary hopper, the bottom of which is semicircular, and 10 indicates a circular tapering band which extends into a circular groove 11 in the revolving wheel 7, as shown in Fig. 3. This band is provided at its bottom with a series of perforations 12.

13 indicates the regulating-lever, which is slidably secured at 14 to the frame 2 by means of a bolt 15 passing through slots 16 in said regulating-lever. A semicircular boss 17 acts as a bearing for said regulating-lever, and the lever is curved to conform to the contour of the said boss 17, so that by pushing the handle 13' toward the hopper the said lever will slide forward on the boss 17, and by drawing the handle away from the hopper the said lever will slide backwardly. The forward or regulating portion of the said lever is curved to conform to the circular hopper and is bifurcated, as shown in Fig. 1. A slide 18 is passed between the bifurcated portion of said regulating-lever, as shown at Fig. 1, and set-screws 19 are utilized for the purpose of securing said slide within the regulating-lever and holding the same in proper position. Said slide 18 is provided with a series of perforations 20 and also with a series of slots 21, as shown in Fig. 2.

22 indicates a disk constructed of two semicircular sections 23 and 24. A series of pins 25 are secured to the faces of said disks 23 and 24 and extend outwardly a distance into the stationary hopper, as shown in Fig. 3. These pins and disk 22, carrying the same, revolve with the revolving wheel 7, and the said pins act as agitators for the seed or fertilizer in the stationary hopper. A series of guide-pieces 26 are also secured to the face of the disk 22, near the periphery thereof, which also act to agitate the seed or fertilizer and to guide and force the same through the perforations 12 in the bottom of the stationary hopper.

To refer now to Fig. 4, it will be seen that this figure shows a slight modification of the disk 22. In place of said disk 22 I provide a disk 27, comprising two covering-plates 31 and 32, said plates being made of two semicircular sections, one of which is shown in Fig. 5. Located between said covering-plates and secured thereto is a series of substantially triangular blocks 30. A series of blocks 33 are inserted between the blocks 30, said blocks 33 being reversible, so that they can lead the seed into the perforations in the stationary hopper. The difference in effect between this construction and that of Fig. 3 is that by this construction the seed is dropped at intervals, as will be now described. The blocks 33 are provided at the outward edges thereof with an opening 34, and the outward covering-plate 32, which is formed of two semicircular sections, is secured over said blocks 33, so that the openings 35 in said covering-plate are directly over the openings 34 in said blocks 33. The portion of the material of said disk 32 at the openings 35 is opened outwardly, forming guides 36, as shown in Fig. 4. This disk revolves with the revolving wheel within the stationary hopper. The guides 36 lead the seed into the openings 34 in the blocks 33, and when said openings 34 coincide with the perforations in the bottom of the stationary hopper the seed in the openings 34 passes out of the stationary hopper and is thus distributed. No seed can pass from the stationary hopper until one of the openings 34 coincides with one of the perforations in the bottom of the stationary hopper. These openings and perforations can of course be regulated and limited so that the seed can be dropped at certain intervals.

To refer now to Fig. 1 and to the slide 18 in the bifurcated portion of the regulating-lever, said slide can be moved within said lever so that the perforations 20 in said slide, Fig. 2, can be made to exactly coincide with the perforations in the stationary hopper or said slide can be moved so as to entirely cover up the perforations in the stationary hopper, or partially so. It is therefore obvious by the adjustment of said slide any amount of seed desired can be allowed to pass out of the stationary hopper, both when using the disk as shown in Fig. 3 and the disk as shown in Fig. 4. As above stated, the slide 18 is also provided with a series of slots 21, which can be made also to coincide with the perforations in the stationary hopper, which is advantageous when distributing the fertilizer therefrom.

In the modification shown in Fig. 8 I show the slide 18 provided with four slots 18', a series of perforations $18^2$ on one side of said slide, and a series of slots $18^3$ on the other side of said slide. This slide is adjustable on the regulating-lever 13 by means of two bolts 19, passing through the slots 18' in the said slide 18, and as the bottom of the stationary hopper is provided with a series of openings the said slide 18 can be reversed, so as to cause either the perforations $18^2$ or the slotted openings $18^3$ to coincide with the stationary openings 12 in the stationary hopper. Besides regulating the amount of seed dropping from the stationary hopper, by means of this construction I provide for regulating the amount of seed passing through the perforations in the hopper by means of the regulating-lever. As before stated and as shown in Fig. 7, the said lever is capable of sliding forwardly and backwardly upon the boss 17. It can therefore be seen that an advance movement of the said regulating-lever will move the slide 18 on the bottom of the stationary hopper, which will diminish the openings in said hopper, so as to cause a smaller quantity of seed to be dropped therefrom. The range of adjustment of this lever is of course not as great as that of the slide 18; but this construction is most advantageous, for the reason that the adjustment can be made instantly and the amount of seed dropping from the stationary hopper can be increased or diminished, as the operator desires.

In order to drop the seed and deposit fertilizer simultaneously, the slide 18 is arranged so that the slotted openings therein coincide with the openings in the bottom of the stationary hopper, and the planter may be arranged so as to lead the seed from the stationary hopper into the revolving hopper. The seed and fertilizer may be both deposited in the stationary hopper; but as the fertilizer is heavier than the seed it falls to the bottom of the stationary hopper and passes through the slot-openings in the slide 18. The seed is agitated in the stationary hopper and may be led through into the revolving hopper and is deposited therefrom in the manner as described in my contemporaneous pending application Serial No. 171,083. Thus the fertilizer and seed are deposited at the same time, but on opposite sides of the carrying-wheel. The agitating of the seed in the stationary hopper acts also as a cleaner, keeping the fertilizer from sticking or clogging the inside of the hopper, which is a great disadvantage to fertilizer or guano distributers generally.

Having thus fully described my invention, I do not wish to be understood as limiting myself to the exact construction herein set forth, as various slight changes could be made therein which would fall within the limit and scope of my invention, and I consider myself clearly entitled to all such changes and modifications.

What I claim as my invention, and desire to secure by Letters Patent of the United States, is—

1. In a planter, the combination of a rotating wheel, and a stationary hopper, means carried on said wheel for discharging seed from said hopper at intervals, and means under said hopper for regulating the intervals between each discharge.

2. In a planter, the combination of a rotating wheel, a stationary hopper, means for discharging seed from said stationary hopper at intervals and means for regulating the intervals between each discharge of seed and means for regulating the quantity of seed discharged.

3. In a planter, the combination of a rotating wheel and a hopper associated therewith, means for discharging the seed from said hopper, means carried on said wheel for agitating the seed within the hopper and means on said wheel for guiding the seed into said discharging means.

4. In a planter, the combination of a rotating wheel and a stationary hopper, means for discharging the seed from said stationary hopper at intervals, means for regulating the intervals between each discharge of seed, means for regulating the quantity of seed discharged and means for guiding the seed into said discharging means.

5. In a planter, the combination of a rotating wheel a hopper associated therewith, means for discharging the seed from said hopper, means for agitating the seed within said hopper, means for guiding the seed into said discharging means and means for regulating the quantity of seed discharged.

6. In a planter, the combination of a rotating wheel, a hopper associated therewith, means for discharging the seed from said hopper at intervals, means for regulating the intervals between each discharge of seed and means for regulating the quantity of seed discharged.

7. In a planter, the combination of a rotating wheel, and a hopper associated therewith, means for discharging the seed from said hopper at intervals, means for regulating the intervals between each discharge of seed, means for regulating the quantity of seed discharged and means for guiding the seed into said discharging means.

8. In a planter, the combination of a rotating wheel, a hopper associated therewith provided with a series of perforations in the bottom thereof, a slide secured under said hopper and provided with a series of seed-perforations, and with a series of fertilizer-slots adapted to be moved so as to cause its said series of perforations to partially or wholly coincide with the said perforations in the bottom of the hopper so as to regulate the quantity of seed discharged therefrom.

9. In a planter, the combination of a rotating wheel, and a hopper associated therewith provided with perforations in the bottom thereof, a slide secured under said hopper and provided with a series of fertilizer-slots and adapted to be moved so as to cause said series of slots to partially or wholly coincide with the perforations in the stationary hopper to regulate the quantity of fertilizer discharged therefrom.

10. In a planter, the combination of a rotating wheel, and a hopper associated therewith, provided with perforations in the bottom thereof, a bifurcated regulating-lever and a slide adjustable therein provided with a series of perforations, said lever being adapted to be moved to cause the perforations in said slide to partially or wholly coincide with the perforations in said hopper.

11. In a planter, the combination of a rotating wheel, and a hopper associated therewith, provided with perforations in the bottom thereof, a regulating-lever carrying a slide beneath said hopper, said slide being provided with a series of perforations, means for adjusting said slide on said lever to cause its perforations to partially or wholly coincide with the perforations in said hopper, said lever being adapted to be moved so as to regulate the coincidence of the perforations in said slide with the perforations in said hopper.

12. In a planter, the combination of a rotating wheel, provided with a groove therein and a hopper associated therewith, said hopper comprising a band adapted to extend within the said groove in said rotating wheel and means for discharging the seed from the hopper.

13. In a planter, a hopper comprising a side, a bottom and a rotating wheel, said rotating wheel having a groove in its face into which the said bottom extends.

14. In a planter, the combination of a rotating wheel and a hopper associated therewith and provided with a perforation in the bottom thereof, a regulating-lever, having a perforation therein, a boss upon which said lever is mounted, and means for allowing said lever to be rocked on said boss to cause the perforation in said lever to partially or wholly coincide with the perforation in said hopper.

In testimony whereof I affix my signature in presence of two witnesses.

WILLIAM THOS. ARNOLD.

Witnesses:
R. C. EVA,
C. W. ENNIS.